United States Patent [19]

Auerbach et al.

[11] 3,908,078

[45] Sept. 23, 1975

[54] METHOD AND APPARATUS FOR DIGITAL RECOGNITION OF OBJECTS PARTICULARLY BIOLOGICAL MATERIALS

[75] Inventors: Sidney Auerbach, Avenel, N.J.; Alfred Lovitz, Jr., Columbus, Ohio

[73] Assignee: Object Recognition Systems, Inc., New York, N.Y.

[22] Filed: July 25, 1973

[21] Appl. No.: 382,523

Related U.S. Application Data

[63] Continuation of Ser. No. 187,193, Oct. 6, 1971, abandoned, which is a continuation of Ser. No. 765,235, Oct. 4, 1968, abandoned, which is a continuation-in-part of Ser. No. 614,994, Feb. 9, 1967, abandoned, which is a continuation-in-part of Ser. No. 457,763, May 21, 1965, abandoned.

[52] U.S. Cl. ..... 178/6.8; 178/DIG. 1; 178/DIG. 36; 178/DIG. 37; 178/DIG. 38

[51] Int. Cl.² ............................................ H04N 7/18

[58] Field of Search ........... 178/6.8, DIG. 1, DIG. 3, 178/DIG. 36, DIG. 37, DIG. 38; 179/2 CA

[56] References Cited

UNITED STATES PATENTS

| | | | |
|---|---|---|---|
| 2,561,197 | 7/1951 | Goldsmith | 178/6.8 |
| 3,347,981 | 10/1967 | Kagan | 178/5 |
| 3,553,358 | 1/1971 | Lauer | 178/6.8 |

OTHER PUBLICATIONS

IBM Technical Disclosure Bulletin "Video Measuring System," Vol. 11, No. 3, Aug. 1968, pp. 287–288.

*Primary Examiner*—Howard W. Britton
*Attorney, Agent, or Firm*—Gottlieb Rackman Reisman, Kirsch

[57] ABSTRACT

An object field is scanned in two dimensions to produce a video signal representative of an object therein. An analog-to-digital converter produces digital outputs at a rate such that the sampling interval is at least as long as approximately a line scanning interval, and preferably the sampling rate is less than the line scanning frequency. The digital outputs vary with overall or general average value of the video signal during time periods at least as long as approximately a line scanning interval. The digital values thus obtained are supplied to a digital computer for comparison with stored values of tissue or other objects in a similar category, to determine whether the tissue is normal or abnormal, etc. Advantageously the video signal is filtered to remove the line scanning frequency and higher frequencies before digitizing it, and in such case other means for comparison may be employed.

12 Claims, 6 Drawing Figures

INVENTORS
SIDNEY AUERBACH
ALFRED LOVITZ, JR.
BY
ATTORNEYS

METHOD AND APPARATUS FOR DIGITAL RECOGNITION OF OBJECTS PARTICULARLY BIOLOGICAL MATERIALS

CROSS-REFERENCE TO RELATED APPLICATIONS

This is a continuation of application Ser. No. 187,193 filed Oct. 6, 1971, now abandoned; which was a continuation of application Ser. No. 765,235 filed Oct. 4, 1968, now abandoned; which was a continuation-in-part of application Ser. No. 614,994 filed Feb. 9, 1967, nowabondoned; which was a continuation-in-part of application Ser. No. 457,763, filed May 21, 1965, now abandoned.

BACKGROUND OF THE INVENTION

Personal examination of biological materials, particularly microscopic examination to determine normal or abnormal conditions, in time-consuming and frequently requires a highly trained pathologists. Consequently, to reduce the cost and facilitate more widespread examinations, considerable effort has been expanded to develop automatic apparatus which will reduce the manual labor involved.

Much of the effort has been devoted to blood analyses wherein suitably prepared slides are scanned by television camera techniques and the cells counted. In some apparatus, cells in different size ranges are counted separately. Such apparatus is limited to situations where cells or other particles can be separately identified and counted, and where the count yields the desired information.

For more general examination, such as studying and evaluating pathological tissue in the form of macroscopic or microscopic human, animal or plant specimens, a photoelectric isophotometer may be employed in which high intensity light is passed through the specimen and the resultant density pattern recorded for examination. This procedure is still quite time-consuming and expensive.

It has also been proposed to scan a blood cell or the like in two dimensions using a television-like scan of a microscope field, and record the light value at each elementary area in the field as a binary digit. The resultant data may then be subjected to computer analysis. This technique leads to a very large number of digits for representing the sample, with consequent elaborate apparatus and processing during subsequent analysis.

In the more general field of product inspection, it has been proposed to record on magnetic tape the complete television video signal of the article under examination, and compare this with a video signal of a master article to determine deviations at any point in the signal. Like the preceding apparatus, this compares signals on an elementary area basis.

SUMMARY OF THE INVENTION

The present invention relates to an improved method and apparatus for object recognition and evaluation. While particularly directed to the analyzing of biological tissue and the like, such as evaluating nuclear and cytoplasmic structure and cellular patterns, it is capable of broader application.

In accordance with the invention, the object is scanned in two dimensions by a suitable television-type camera to develop a video signal corresponding to successive line means over the desired field. The object may be a slide or smear of the tissue, etc. to be examined. The video signal is amplified and advantageously filtered to eliminate the line scanning frequency and higher frequency components. The video signal is then converted from analog to digital form, preferably by an analog-to-digital (A/D) converter, and suitably coded for computer analysis. The video signal may also be displayed on a monitor oscilloscope synchronized with the camera to display the field signal.

The sampling rate for producing digital values in predetermined such that the intervals of successive samplings are at least as long as approximately a line scanning interval, and advantageously the sampling rate is less than the line scanning frequency. The digital outputs vary with the overall or generally average value of the video signal during time periods at least as long as approximately a line scanning interval, and may be the general average of several lines. As a result, only a moderate number of digits are required to represent the tissue or other object scanned, generally less than the number of scanning lines. The actual number of digits may be selected in view of the complexity of the tissue or other object being examined. Approximately fifty have been employed with success, although a greater number may be desirable depending on the specimen being examined.

The digital values are supplied to a digital computer for comparison with digital values obtained in like manner from other specimens. Thus if human tissue is to be examined to determine whether it is normal or abnormal, digital values representing normal tissue may be stored in the computer and values of tissue under test compared therewith.

This procedure has an important advantage over systems in which elementary areas along the scanning lines are individually digitized, in that far fewer digits serve to represent the specimen. This greatly facilitates computer analysis. Further, if elementary areas are digitized, it may be expected that the digital values and their sequence will change greatly depending on the detailed distribution of cells in the specimens under test, even though the specimens are all normal. In accordance with the present invention the digital values vary with the overall value of a line scansion, or of several lines, thereby being less subject to variation due to different positions of cells along a line, and yet responding to changes in size and number of cells along a line.

Although it is preferred to digitize the video signal and use a digital computer, if the video signal is filtered as described above, the filtered signal of the object under test may be compared with a stored video signal obtained in like manner by other means for comparing curves, or even visual comparison.

DESCRIPTION OF THE EMBODIMENTS

Figures 1, 2, 3A, 3B, 3C, 3D:
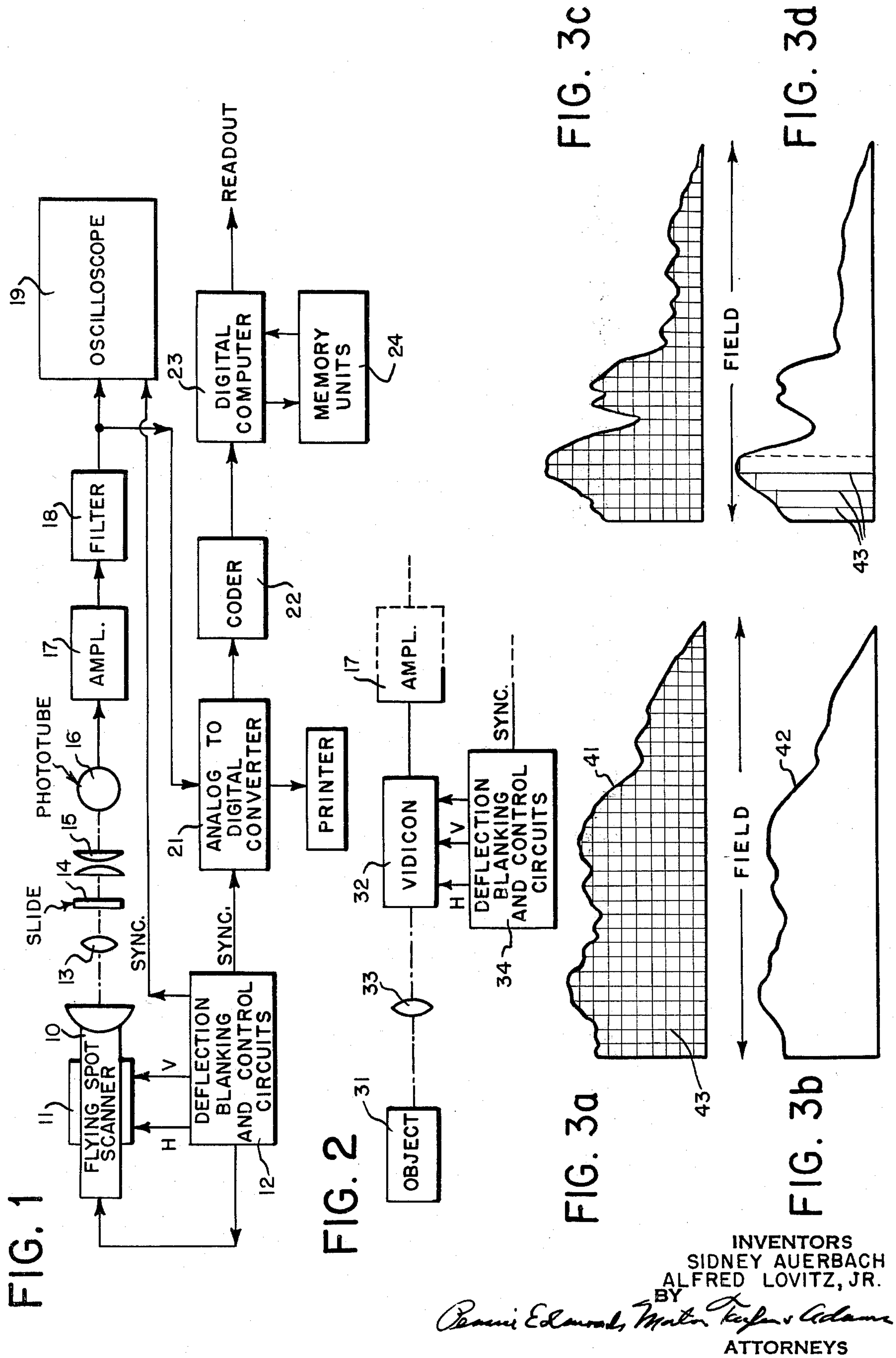
FIG. 1 shows apparatus in accordance with the invention using a flying spot scanner.
FIG. 2 is a similar apparatus using a Vidicon scanner.
FIG. 3A, FIG. 3B, FIG. 3C and FIG. 3D show graphs explanatory of the operation of the apparatus of FIGS. 1 and 2, as well as manual encoding.

Referring to FIG. 1, a television-type camera of the flying spot type is employed. A cathode ray tube 10 with deflecting yoke 11 is supplied with horizontal and vertical sawtooth scanning signals, blanking signals, control signals including light intensity control, and operating voltages from suitable sources generally designated by block 12. The luminous scanning spot developed on the face of cathode ray tube 10 is focussed by objective lens 13 on a slide 14 held in a suitable support (not shown). A field lens 15 directs the light passing through slide 14 to a photo-tube 16 to produce a video signal whose amplitude varies with the density of the slide 14 along successive scanning lines on the scanned field. The video signal is supplied to amplifier 17.

The flying spot camera as described so far may be of conventional design, and suitable units are commercially available. The line and field scanning frequencies may be selected as desired, and conventional television standards of 525 lines and 60 fields per second, resulting from a 60-cycle field scanning frequency and 15,750 Hertz (cycles per second) line scanning frequency, has been employed with success. Although this normally corresponds to a double-interlaced scanning pattern, the use of interlacing is not considered important, and in practice interlacing is frequently imperfect.

Advantageously, the video signal from amplifier 17 is passed through a low pass filter 18 designed to eliminate the line scanning frequency and frequencies thereabove, so as to produce a smoothed video signal. Thus, filter 18 may be designed to cut off below 15 K8 and may have selectable cutoff frequencies. The effect of filtering will be discussed further below. If desired, amplifier 17 may be designed as a banspass amplifier to include the filtering provided by filter 18, and the separate filter eliminated. Video amplifier and filter design is well known, and suitable units are commercially available.

The resultant smoothed video signal is supplied to oscilloscope 19 for visual observation. A field synchronizing signal from 12 is supplied to oscilloscope 19 to synchronize the sweep circuits thereof so that the resultant display is of field scansions.

The smoothed video signal is also supplied to an analog-to-digital converter 21 to convert amplitude variations in the video signal into corresponding digital values. Analog-to-digital converters are well known in the computer art and several types are known and commercially available. For example see TOU, "Digital and Sampled-Data Control Systems," McGraw-Hill, 1959, Chapter 8, and instruments made by Nuclear-Chicago Corporation. In general, the signal is sampled at successive intervals, and the amplitude of the signal at a given interval is converted to a corresponding digital output.

The output of converter 21 is supplied through coder 22 to a digital computer 23 for evaluation. The computer includes memory units 24 for storage and retrieval of a digital sequence, so that stored sequence may be compared with a new input sequence to determine correspondence or non-correspondence therebetween and an appropriate readout signal produced. The coder 22 may be designed in conventional manner to receive the digital outputs of converter 21 and transform the outputs into the code which computer 23 is designed to accept. Some commercially available analog-to-digital converters yield binary coded digital outputs and many known types of computers use binary coded inputs. In such case coder 22 may be unnecessary.

The digital outputs of converters 21 may also be supplied to a printer 24 so as to obtain a permanent record. This may be of conventional typewriter type. Instead of supplying the output of converter 21 directly to a computer, the digital outputs may be recorded in suitable form, such as on a punched card, punched tape or magnetic tape, and the recorded data subsequently fed to a computer for analysis. In such case, printer 24 would be a suitable tape or punch card recorder. If additional coding is required and coder 22 is employed, the output of the coder could be recorded and subsequently fed to a computer. These procedures are well known in the computer art.

In accordance with the invention, the video signal is converted to digital values at a rate such that the intervals of successive analog-to-digital conversions are at least as long as approximately a line scanning interval in the video signal, and the digital outputs are produced for at least a substantial portion of a field scansion. Further, the digital output varies with the overall value of the video signal during time periods at least as long as approximately a line scanning interval of the video signal. In this manner, only a moderate number of digital values suffice to represent the scanned object. These aspects of the invention will be discussed below in connection with FIG. 3.

Referring to FIG. 2, the flying spot camera of FIG. 1 is replaced by a Vidicon camera. Here an object 31 is focussed on a Vidicon tube 32 by lens 33 and the output of the Vidicon tube is supplied to amplifier 17. Suitable deflection, blanking and video level control circuits 34 are provided so as to provide the necessary line and field scanning waves H,V and other control signals to the Vidicon tube 32. These may follow conventional practice and suitable Vidicon cameras are available commercially.

The vidicon camera arrangement of FIG. 2 is suitable for scanning three-dimensional objects as well as slides, whereas the flying spot camera of FIG. 1 is more especially suitable for slides. Also, the Vidicon arrangement has operating advantages which facilitate its use. It should be understood that in the case of slides, photographs, etc. it may be desired to confine attention to a particular portion deemed of interest and lenses 13 or 33 may be selected accordingly. The same is true of lens 33 when only a portion of a large object is to be examined. Also, the Vidicon of FIG. 2 can be arranged to view a slide, tissue smear, etc. through a microscope, if desired. Amplifier 17 and the sync output of block 34 in FIG. 2 are connected to further circuits in the same manner as in FIG. 1.

Referring to FIG. 3(*a*), curve 41 represents the envelope of the video signal displayed on the oscilloscope 19 when a photomicrograph of cellular tissue is scanned. The oscilloscope is synchronized by the field synch signal so that the curve 41 represents a field scansion. Actually, the fields repeat a 60 Bertz rate, but successive fields are the same, except for possible slight differences resulting from interlacing if employed. Without filter 18, the area below curve 41 will be luminous and some line structure may be visible, as well as shadow patterns corresponding to light and dark areas in the photomicrograph along the scanning lines. These details are impractical to show, but the grid 43 referred to hereinafter may be understood to indicate that the area is filled in.

It will be observed that the amplitude of curve 41 varies over the field scansion, depending on the overall value of the signal corresponding to successive lines, which in turn depends on the relative amounts of light and dark areas along successive lines. It is difficult to state precisely the relationship between signal amplitude as represented by curve 41 and the variation and intensity of light along the lines, since many factors are involved. The signal amplitude is believed to represent a general averaging or integration of the light along each line, when these terms are used broadly rather than in their strict mathematical sense. In any event, it is clear that it does not represent the detailed variation in the light intensity along each line, but rather a value which depends on the overall light intensity along each line. Accordingly the term "overall value" is used herein.

Curve 42 (FIG. 3*b*) illustrates the signal of FIG. 3(*a*) after passing through filter 18 which eliminates the line scanning frequency and higher frequencies. In general curve 42 follows the variations in curve 41, although in practice some rounding off of sharp peaks and valleys is noted. The effect of the filtering in precise mathematical terms is also difficult to state, but it is believed to result in a general averaging effect over the lines.

Regardless of the difficulty in precise statement, it is found that the amplitude for a given line does change for different light and dark contents along that line, and the overall curve does change for different cellular tissues. Thus FIG. 3(*c*) illustrates a pattern on the oscilloscope when a photomicrograph of a different type of cellular tissue was scanned without filter 18, and FIG. 1(*d*) shows the video signal after passing through filter 18.

Again, regardless of the difficulty of precise statement, it will be appreciated that if the name or similar equipment is used for developing and digitizing video signals of objects to be compared, the resulting digital values will have been produced in the same manner and hence may be validly compared.

It is possible to digitize manually the field scansions of FIGS. 3(*a*) and 3(*c*), or the smoothed curves of FIGS. 3(*b*) and 3(*d*), by placing a grid over the face of the oscilloscope as shown at 43. Each vertical column can be used as a sampling time and the number of squares counted to assign a digital value thereto. With smaller squares in the grid, more accurate digitizing may be obtained. As will be recognized, the width of each column of squares represents a time period, since the length of the field corresponds to the field period. Each columns includes a number of line scansions, so that the sampling time period of a column is several line scansions intervals, a line scanning interval being the time from the beginning of one line scansion to the beginning of the next.

Manual digitizing is of course time-consuming and tedious, and the coding resolution rather coarse compares to the resolution available in A/P converters. Hence an A/D converter 21 is used in FIGS. 1 and 2 to accomplish a similar result automatically. The converter is synchronized by a field sync signal from 12, so that the conversion always starts at a desired point in a field scansion. The sampling rate is selected so that the sampling intervals (beginning of one sampling to beginning of the next) are at least long as approximately a line scanning interval. Thus the sampling rate is not substantially greater than the line scanning frequency. Much lower sampling rates have been employed with success.

Some types of A/D converters store the signal amplitude at the beginning of each sampling interval, and it is this value which is digitized. In such case it is advantageous to employ filter 18 as illustrated, so that a smoothed video signal is supplied to the A/D converter and variations in amplitude along a single line does not affect the digitizing. This is illustrated by lines 43 in FIG. 3(*d*). The spacing of lines 43 as illustrated corresponds to many lines, so that digitizing the initial value of each sampling interval could result in considerable error. Increasing the sampling rate will reduce the error, but this is impractical to illustrate.

A/D converters are available of the so-called transient averaging type in which the average value of the video signal over the sampling time is digitized. In such case it may be feasible to eliminate filter 18 and rely on the A/D converter to digitize the overall value of the video signal. However, even with such an A/D converter it is preferred to employ filter 18.

As an example, the use of the disclosed apparatus for examination of human tissue will be described. A standard microtome, cryostat section or the like may be prepared and stained by hematoxylyn and cosin or other suitable substances to distinguish or accentuate the density pattern therewithin. After the tissue has been thus prepared, a photomicrograph may be made of the tissue and placed in the position of slide 14 in FIG. 1 and scanned. Or, it may be placed over a suitable diffused light source and used as object 31 in FIG. 2. Assume it is desired to determine whether the tissue is normal or abnormal. A slide of normal tissue may be prepared, scanned and digitized, and the digital values supplied to computer 23 and stored in the memory 24 thereof. A slide of the tissue under test is then scanned and digitized, ad the digital values supplied to the computer for comparison with the stored values to determine whether they are like or unlike, yielding an appropriate readout signal. If only a portion of the slide is deemed of interest, the scanning may be confined to only that portion.

It is desirable of course to standardize the preparation, magnification, etc. of the tissues to be compared, and to standardize the scanning conditions, so that like tissues will give similar digital values. However, even normal tissue may be expected to vary somewhat, so that an appropriate deviation range may be established for normal tissue, and tissue falling outside this range identified for detailed pathological examination. It is to be expected that different types of animal tissue, although normal, will give different digital values. Thus tissue may be classified into categories familiar in pathology, and the ordinary range of digital values for normal tissue of each category stored in the computer memory for comparison with future tissues in that category. Certain types of abnormal tissue may be sufficiently distinctive to warrant storage of the corresponding digital values so that tissue falling within a selected deviation range of those valuse may be identified.

For evaluation of a variety of categories of tissue, corresponding digital sequences may be stored in the memory units 24 and identified in known manner for retrieving the proper category. Similarly, a digital sequence from the A/D converter may be identified in known manner in accordance with its category to enable proper comparison in the computer.

It will be evident that the above procedure is highly valuable in promoting economical tissue examination on a large scale, since the detailed examination by a pathologist is confined to only the portion identified as outside the selected normal deviation range. Also, prompt evaluation is possible if the computer is part of the equipment, or quickly available when required.

While it is preferred to digitize the video signal automatically as described, and use a digital computer, other comparison procedures are possible. Thus the video patterns on the oscilloscope, such as shown in FIG. 3, may be photographed and a file accumulated showing typical patterns of various tissues, etc. These may be visually compared with the video pattern of a tissue under examination, or with a photograph thereof. Photographs of the filtered video signal, as shown in FIGS. 3(*b*) and (*d*), or transparent slides made therefrom, may be compared with photographs or slides made of a tissue under examination, in curve comparators if desired.

Although the invention is particularly valuable in the examination of human tissue, it is believed useful in a wide variety of applications where recongition or discrimination between objects is desired, for example, photographs, X-rays, personal objects, etc.

The invention has been described in connection with specific embodiments thereof. It will be understood that modifications and further elaborations are possible within the spirit and scope of the invention as defined in the claims.

We claim:

1. Apparatus for producing a digital representation of an object to be recognized and for comparing its digital representation to a set of digital representations of known objects which comprises means for scanning an object field in two dimensions at line and field scanning frequencies to produce a video signal representative of an object in said object field, means including an analog-to-digital converter for producing at least several digital outputs during each field scansion, each of said digital outputs being proportional to the overall value of said video signal during a time period at least as long as approximately a line scanning interval of said video signal, said at least several digital outputs being produced for at least a substantial portion of a field scansion at a rate such that the intervals of successive analog-to-digital conversions are at least as long as approximately a line scanning interval in said video signal, and means for comparing said at least several digital outputs with said set of ditigal representations of known objects.

2. Apparatus according to claim 1 in which said rate of producing digital outputs is less than said line scanning frequency.

3. Apparatus according to claim 1 including means for supplying said digital outputs to a digital computer, whereby digital outputs corresponding to one object may be compared with digital outputs corresponding to another object.

4. Apparatus according to claim 1 including means for recording said digital outputs.

5. Apparatus according to claim 1 in which each of said digital outputs is proportional to the average value of said video signal during a respective time period.

6. Apparatus for producing a digital representation of an object to be recognized and for comparing its digital representation to a set of digital representations of known objects which comprises means for scanning an object field in two dimensions at line and field scanning frequencies to produce a video signal representative of an object in said object field, means for filtering said video signal to substantially remove frequencies at and above said line scanning frequency to thereby produce a smoothed video signal, an analog-to-digital converter for sampling said smoothed video signal at least several times during a field scansion at successive intervals and producing corresponding digital outputs for at least a substantial portion of a field scansion, and means for comparing said produced digital outputs with said set of digital representations of known objects.

7. Apparatus according to claim 6 including means for supplying said digital outputs to a digital computer, whereby digital outputs corresponding to one object may be compared with digital outputs corresponding to another object.

8. Apparatus according to claim 6 including means for recording said digital outputs.

9. Apparatus according to claim 6 in which said sampling rate is less than said line scanning frequency.

10. Apparatus according to claim 9 including means for supplying said digital outputs to a digital computer, whereby digital outputs corresponding to one object may be compared with digital outputs corresponding to another object.

11. The method of producing a digital representation of an object to be recognized and for comparing its digital representation to a set of digital representations of known objects which comprises scanning said object in two dimensions at line and field scanning frequencies to produce a video signal, converting at least several successive portions of said video signal during a field scansion into digital values each of which varies with the overall value of the video signal during a corresponding time period at least as long as approximately a line scanning interval of said video signal, said at least several digital values being produced for at least a substantial portion of a field scansion and the time intervals corresponding to successive digital values being at least as long as approximately a lIne scanning interval, and comparing said at least several digital values with said set of digital representations of known objects.

12. The method according to claim 11 including supplying said digital values corresponding to said object to be recognized to a digital computer for storage therein, and supplying digital values corresponding to said known objects to said computer for comparison with the digital values of said object to be recognized.

* * * * *